March 30, 1965 S. I. WEISS 3,175,548
CUTTING WHEEL HOLDERS
Filed May 14, 1964
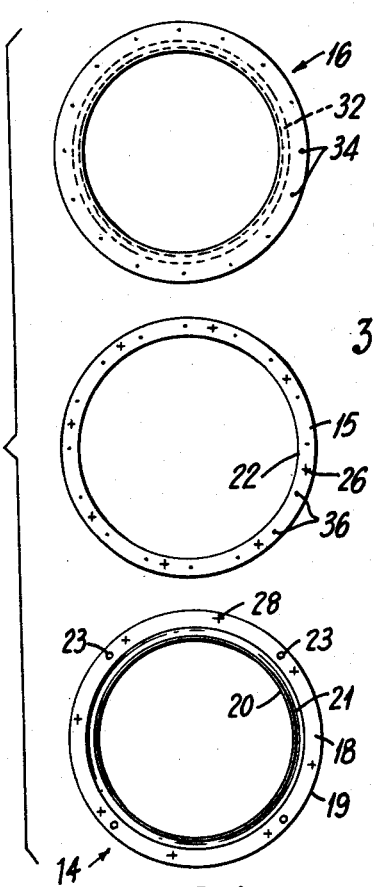
FIG.1
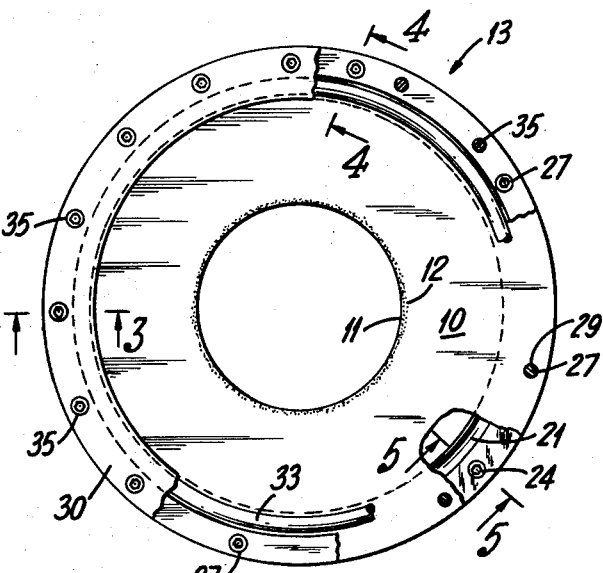
FIG.2
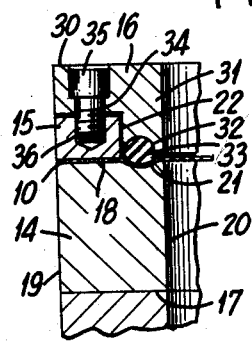
FIG.3
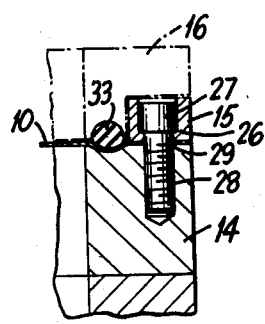
FIG.4
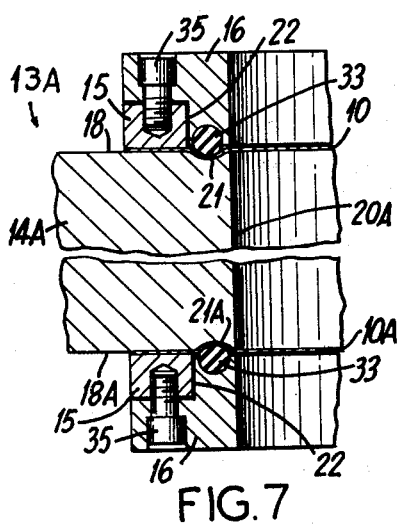
FIG.7
FIG.5
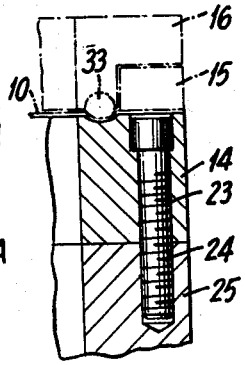
FIG.6
INVENTOR.
SHIRLEY I. WEISS
BY
ATTORNEY.

United States Patent Office
3,175,548
Patented Mar. 30, 1965

1

3,175,548
CUTTING WHEEL HOLDERS
Shirley I. Weiss, 11 Riverside Drive, New York, N.Y.
Filed May 14, 1964, Ser. No. 367,404
12 Claims. (Cl. 125—15)

This invention relates to holders for annular cutting wheels having a cutting edge on the inner peripheral portion thereof.

Annular cutting wheels formed of thin sheets of Phosphor bronze, beryllium copper or the like, are provided with inner cutting edges made of hard abrasive material such as diamond dust or the like. Such cutting wheels are typically used to cut thin slices or wafers from hard, brittle materials such as silicon, germanium, sapphire, quartz or the like in crystal or boule form. These cutting wheels are quite thin and may be of the order of as little as .002" in order to minimize waste of the material being cut or sliced.

However, the operation of thin cutting wheels at high rotational speeds, necessarily involves vibration of the cutting edge thereof. Accordingly, holders must be provided for mounting the cutting wheels so as to minimize vibratory effects and thereby insure smooth cutting operations. Patents 2,713,339 and 3,039,235 show typical forms of known cutting wheel holders wherein the outer peripheral portions of the cutting wheel is rigidly clamped, and additional means is provided for rigidly engaging annular portions of the cutting wheel to radially tension the same.

In the actual use of such known cutting wheel holders, the degree of tension induced in the mounted cutting wheel is critical and must be maintained as uniformly as possible during operational use thereof. Thus, from time to time, the operator must stop the cutting machine with which the mounted cutting wheel is associated, in order to effect adjustments in the tension of the cutting wheel. Unless such tension adjustments are made, at appropriate time intervals and by one who is highly skilled in the art, the cutting operation results in badly cut slices or wafers, breakage of the cut material and splitting of the cutting wheels.

Tension adjustments entail shut down of the cutting machine for substantial periods of time, which materially affects the production rate of the machine. Also, unless the machine operator is highly skilled and of long experience, the tension adjustments will not be made at proper time intervals or the adjustments made will not be of such precision as to maintain the quality of the cutting operation, all of which leads to excessive "down time" for the machine, substantial variations in the quality of the cuting operation leading to waste of poorly cut slices or wafers, as well as excessive cutting wheel breakage; which in turn gives rise to high unit cutting costs.

Accordingly, an object of this invention is to provide improved holders for thin annular cutting wheels, which include novel clamping and tensioning means to provide improved tensioning of the cutting wheels so as to materially increase the length of the time intervals between tension adjustments; which allows for precision adjustment of the tension of the mounted cutting wheel by operators with little experience; and which substantially eliminates or materially reduces splitting of the cutting wheels, thereby markedly improving the quality of the cutting operations and substantially reducing operating costs.

Other objects of this invention will in part be obvious and in part hereinafter pointed out.

In the drawing, FIG. 1 is a plan view showing the several, separated elements forming the holder for annular cutting wheels, embodying the invention;

2

FIG. 2 is a plan view showing the assembled elements of such holder with the cutting wheel mounted therein, and with parts cut away;

FIG. 3 is a transverse sectional view taken on the line 3—3 of FIG. 2;

FIG. 4 is a transverse sectional view taken on the line 4—4 of FIG. 2;

FIG. 5 is a transverse sectional view taken on the line 5—5 of FIG. 2;

FIG. 6 is an enlarged sectional view showing the details of the resilient tensioning element of the holder; and FIG. 7 is a transverse sectional view showing a double holder for mounting a pair of cutting wheels in accordance with the invention.

Essentially, the holder for annular cutting wheels, embodying the instant invention, comprises an assembly of a base ring, a clamping ring and a tensioning ring. The thin annular cutting wheel is adapted to be clamped about its outer periphery between opposed portions of the base ring and the clamping ring. The tension ring is adapted to be mounted on the clamping ring in a manner to bias a deformable element mounted thereon into engagement with annular portions of the clamped cutting wheel so as to radially tension the same in a resilient manner.

Thus, as shown in FIGS. 1, 2; 10 designates an annular cutting wheel which is formed of copper, beryllium copper, Phosphor bronze, stainless steel or the like, with a thickness as little as .002", but which may be of a thickness of the order of .010". The cutting wheel 10 may have varying degrees of temper and tensile strength, suited to the particular material being cut.

The cutting wheel 10 has its inner annular edge 11 covered with a hard abrasive 12, such as diamond dust or the like, which is applied and bonded to the metal in a manner known in the art.

Cutting wheel 10 is adapted to be mounted in the novel holder embodying the invention and generally indicated at 13. Holder 13 comprises a base ring 14, a clamping ring 15 and a tensioning ring 16. The base ring 14, formed of a hard alloy steel or the like, is of rectangular cross section and includes a flat bottom surface 17, a flat wheel supporting surface 18, an outer annular surface 19 and an inner annular surface 20. The wheel supporting surface 18 of ring 14 is formed with an annular recess 21 located adjacent the juncture of surfaces 18, 20; recess 21 being of arcuate cross section, for the purpose hereinafter appearing.

The clamping ring 15, also formed of hard alloy steel, is substantially square in cross section with an outer diameter substantially equal to that of base ring 14 and an inner diameter somewhat greater than that of base ring 14. Thus, when clamping ring 15 overlies base ring 14 and is in alignment therewith, the inner annular surface 22 of clamping ring 15 is located to expose the recess 21 in surface 18 of the base ring 14.

The base ring 14 is provided with a series of circumferentially spaced counterbored openings 23 to pass and seat mounting bolts 24 for positively securing ring 14 to a base portion 25 of the cutting machine, not shown, with which cutting wheel 10 is to be associated. Machine base portion 25 is formed with threaded recesses in aligned relation to openings 23 for receiving mounting bolts 24.

Clamping ring 15 is formed with a series of circumferentially spaced counterbored openings 26 to pass and seat clamping bolts 27 which are adapted to be screwed into threaded recesses 28 in base ring 14 and located in alignment with openings 26 in ring 15. Thus, cutting wheel 10 is provided with circumferentially spaced openings 29 on the outer peripheral portion thereof for registry with openings 26 on ring 15 and recesses 28 on ring 14, and the cutting wheel 10 is clamped between rings 14, 15 when bolts 27 are screwed into place. The cutting edge 12 of cutting wheel projects radially inward beyond inner annular surface 20 of base ring 14.

Tensioning ring 16, also formed of a hard alloy steel or the like, is of right angle cross section, and comprises a flange portion 30 extending radially outward of an inner web portion 31. Ring 16 is adapted to be mounted with the flange 30 thereof overlying the top surface of clamping ring 15 and its web portion 31 directed downwardly toward the groove 21 on base ring 14.

Web portion 31 of tensioning ring 16 is formed on its underside with an annular groove 32 which is part cylindrical in cross section and is in alignment with groove 21 on base ring 14. An O ring 33 of rubber or other suitable deformable, elastomeric, resilient material, is mounted in groove 32. Preferably groove 32 has a circumferential extent somewhat greater than 180° so as to readily retain O ring 33 therein, yet allowing a circumferential portion of said O ring, somewhat less than 180° in extent to project from the undersurface of web portion 31.

The O ring 33 has a hardness of 80 to 95 Durometer and the specific hardness thereof may be selected in accordance with the temper of the metal of cutting wheel 10. The flange portion 30 of tensioning ring 16 is formed with a series of circumferentially spaced, counterbored openings 34 to pass and seat tensionally bolts 35 which are screwed into threaded recesses 36 arranged in alignment with openings 34 in ring 16.

By way of example, mounting bolts 24 for securing the base ring 14 to machine frame portion 25, may be at 90° intervals; clamping bolts 27 for securing cutting wheel 10 in place by clamping ring 15, may be at 45° intervals, and tensioning bolts 35 for securing tensioning ring 16 to clamping ring 15, may be at 24° intervals.

After the outer peripheral portion of cutting wheel 10 has been tightly clamped between base ring 14 and clamping ring 15, tensioning ring 16 is mounted on clamping ring 15 and tensioning bolts 35 are tightened to bias the O ring 33 into engagement with the annular portion of the cutting wheel overlying groove 21 in base ring 14. Sufficient clearance is provided between the opposed surfaces of web portion 31 and ring surface 18, and flange portion 30 and clamping ring 15 to allow for an adjusted pressure of O ring 33 relative to the opposed cutting wheel portion which is pressed into groove 21 of base ring 14.

It has been found, that O ring 33 will be effective to resiliently tension the cutting wheel 10 and to automatically compensate for any localized stresses developed in the tensioned portions of the cutting wheel. Thus, the cutting wheel 10 is more uniformly tensioned and the intervals between necessary tension adjustment have been found to be of greater length. Also, splitting of the cutting wheels has been substantially eliminated.

Furthermore, it has been found that with cutting wheel holders of the instant invention, the tension adjustment may be of an order less precise than that which is mandatory with conventional holders, thus allowing machine operators of lesser skills to operate the machines at high efficiency.

As shown in FIG. 7, a cutting wheel holder 13A similar to holder 31 except as hereinafter pointed out, is used to mount a pair of similar cutting wheels 10, 10A in parallel arrangement, whereby to simultaneously cut two slices or wafers from the crystal or boule, not shown, presented to the cutting machine.

Thus, base ring 14A may be of a suitable thickness to properly space cutting wheels 10, 10A and are provided with annular grooves 21, 21A on their respective wheel supporting surfaces 18, 18A. Clamping rings 15 and tensioning rings 16, as previously described, are mounted on the opposite surfaces of base ring 14A, in the manner described above, to first clamp wheels 10, 10A and then to resiliently tension the same. The base ring 14A has radially outwardly projecting portions for mounting the same on a cutting machine frame portion, not shown, in a manner known in the art.

It is understood that in accordance with arrangements and procedures known in the art, holders 13, 13A may have only rotational movement and are fixed against axial movement, in which case, the work piece to be sliced, in crystal or boule form is mounted and moved by suitable indexing means, to present the same to the cutting wheels 10 or 10, 10A to successively cut individual slices from the intermittently advanced work piece. Alternatively, the work piece is fixed against movement and the holders 13 or 13A are arranged for indexed movement, as well as rotational movement, to cut the individual slices in succession.

It will be apparent that the holder 13 of the instant invention, may also be used to mount thin metal sheets of circular form, in a clamped and tensioned condition as described above, to provide vibration controlled diaphragms and the like.

As various changes might be made in the embodiments of the invention herein disclosed without departing from the spirit thereof, it is understood that all matter herein shown or described shall be deemed illustrative and not by way of limitation, except as set forth in the appended claims.

What is claimed is:

1. A holder for an annular cutting wheel having a cutting edge on its inner periphery, said holder comprising a pair of opposed annular means having surface portions for clamping the outer peripheral portions of said cutting wheel therebetween, one of said annular means including a ring and elastometric means mounted thereon and resiliently engageable with annular portions of said cutting wheel adjacent the clamped portions thereof for radially tensioning said cutting wheel.

2. A holder for an annular cutting wheel comprising a first annular member, a second annular member in opposed relation to said first annular member, means for securing said opposed members together with the outer peripheral portions of said cutting wheel interposed therebetween and clamped by said opposed annular members, a third annular member arranged to have an annular portion thereof in opposed relation to an annular portion of said first annular member, and elastometric deformable means on said annular portion of the third annular member engageable with annular portions of said cutting wheel adjacent the clamped portions thereof for radially tensioning said cutting wheel.

3. A holder for an annular cutting wheel comprising a first ring for engaging and supporting the outer peripheral portion of said cutting wheel, a second ring over said first ring and in alignment therewith, means for securing said rings together with the cutting wheel interposed therebetween to clamp said cutting wheel between said rings, a third ring mounted on said second ring, said third ring having an annular portion in opposed relation to an inner annular portion of said first ring, elastomeric, deformable means on said annular portion of the third ring engageable with an opposed annular portion of said clamped cutting wheel, and means for mounting said third ring on said second ring to urge said deformable means into biased relation with said cutting wheel to radially tension said cutting wheel.

4. A holder as in claim 3 wherein said first ring is formed on its wheel engaging and supporting surface with an annular groove adjacent the inner peripheral edge thereof, said second ring having its inner peripheral edge spaced inwardly of the inner peripheral edge of said first ring, said third ring comprising a web portion and a flange portion extending radially outward of said web portion, said flange portion being disposed in overlying relation to said second ring, said web portion extending axially toward the inner peripheral portion of said first ring, the lower surface of said web portion being formed with an annular recess and said elastomeric, deformable means being mounted in said annular recess, said elastomeric, deformable means being located in opposed relation to the annular groove on said first ring.

5. A holder as in claim 4 wherein said elastomeric, deformable means comprises an annular rubber member of substantially O section, said rubber member having portions thereof projecting from the lower surface of said web portion of the third ring.

6. A holder for a plurality of annular cutting wheels arranged in parallel relation, said holder comprising an annular member having opposite surface portions for engaging and supporting the outer peripheral portions of a cutting wheel, a clamping member in opposed relation to each of the opposite surface portions of said annular member, means for securing each of said clamping members to said annular member with the peripheral portions of said cutting wheels interposed therebetween to dispose said cutting wheels in clamped relation to said annular member, elastomeric, deformable means disposed in opposed relation to each of the opposite surface portions of said annular member radially inward of said clamping members and means for biasing said deformable means into engaging relation with annular portions of each of said clamped cutting wheels to radially tension said cutting wheels.

7. A holder as in claim 6 wherein said elastomeric, deformable means comprises an annular rubber member of substantially O section and each of the opposite surface portions of said annular member is formed with an annular groove located in opposed relation to said annular rubber member.

8. A holder as in claim 7 wherein said biasing means comprises a second annular member having a web portion and a flange portion extending radially outward of said web portion, said web portion being formed on a lower surface portion thereof with an annular recess for receiving said annular rubber member, said flange portion being disposed in overlying relation to said clamping member and means for mounting said flange portion on said clamping member and for biasing said rubber member into gripping relation with opposed annular portions of said cutting wheel.

9. A holder for an annular cutting wheel having a cutting edge on its inner periphery, said holder comprising a base ring having at least one flat surface for supporting and engaging outer peripheral portions of said cutting wheel, a clamping ring arranged in alignment with said one surface of the base ring, means for securing said rings together with the outer peripheral portions of said cutting wheel interposed and clamped therebetween, said clamping ring having an inner diameter less than that of said base ring whereby the inner periphery of said clamping ring is located radially inward of the inner periphery of said base ring, an annular tension member of right angle section comprising a web portion and a flange portion extending radially outward of said web portion, said tension member being disposed over said rings with the flange portion thereof overlying said clamping ring and the web portion thereof overlying inner peripheral portions of said one surface of the base ring, annular deformable means mounted on the underside of the web portion of the tension member and projecting outwardly thereof for contacting an opposed annular surface portion of said clamped cutting wheel, and means for securing said flange portion of the tension member to said rings to bias said deformable means into resilient, tensioning engagement with said opposed annular portion of the cutting wheel.

10. A holder as in claim 9 wherein said one flat surface of the base ring is formed with an annular groove located adjacent the inner periphery of said base ring, said annular deformable means being located in alignment with said groove whereby said annular portion of the cutting wheel is received in said groove when said tension member is secured to said rings.

11. A holder for a thin metal sheet comprising a pair of aligned ring members, said ring members having substantially the same outer diameter, the inner diameter of one of said ring members being greater than that of the other of said ring members, means for securing said ring members together with peripheral portions of said metal sheet interposed and clamped therebetween, a tensioning ring mounted on said one ring member, said tensioning ring comprising an inner annular portion extending toward an annular portion of said clamped metal sheet supported by an inner annular surface portion of said other ring member, and elastomeric, deformable means on the inner annular portion of said tensioning ring in engaging relation to said annular portion of the clamped metal sheet and means for biasing the inner annular portion of said tensioning ring toward said other ring member whereby said deformable means is operative to radially tension the clamped metal sheet.

12. A holder for mounting a thin metal sheet of circular shape, said holder comprising a pair of ring members having different inner diameters, means for securing said ring members in concentric relation with peripheral portions of the metal sheet clamped therebetween, a third ring member mounted on said pair of ring members in concentric relation thereto, said third ring member comprising an inner annular portion disposed adjacent the inner edge of the ring member of larger inner diameter and extending toward an annular portion of said clamped sheet located inwardly of the clamped portion of said metal sheet and supported by an annular surface portion of the ring member of smaller inner diameter, annular resilient, elastomeric, deformable means mounted on the inner annular portion of said third ring member for bearing against the supported annular portion of the clamped metal sheet, and means for biasing the third ring member towards said pair of ring members to cause said deformable means to radially tension the clamped metal sheet.

References Cited by the Examiner
UNITED STATES PATENTS

| | | | |
|---|---|---|---|
| 2,173,555 | 9/39 | Hipple | 51—73 X |
| 2,713,339 | 7/55 | Sayers | 125—15 |
| 2,873,773 | 2/59 | Gaskell | 143—155 X |
| 3,039,235 | 6/62 | Heinrich | 51—73 |

LESTER M. SWINGLE, *Primary Examiner.*

J. SPENCER OVERHOLSER, *Examiner.*